Jan. 5, 1932.  G. H. P. GANNON  1,839,546
WORK HEAD FOR GRINDING MACHINES
Filed May 25, 1928
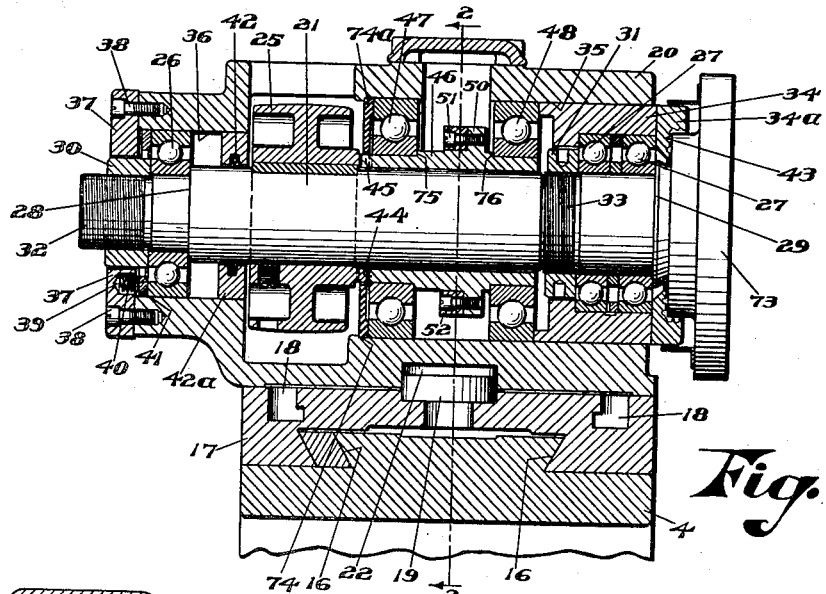
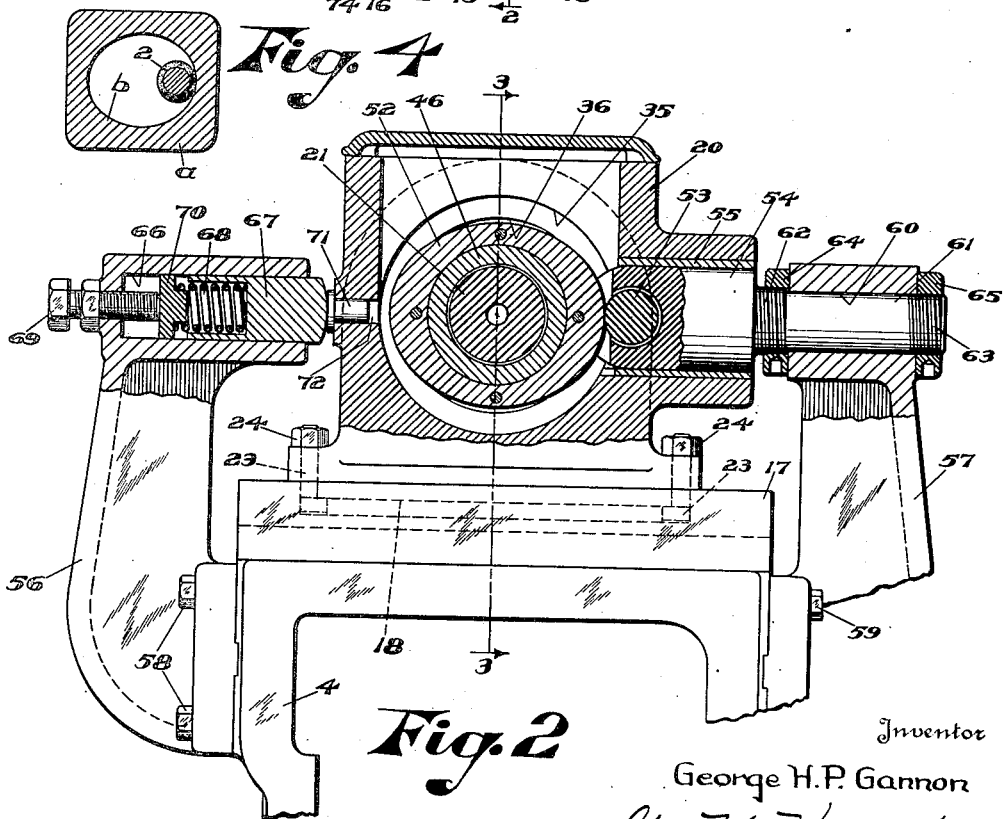
Inventor
George H. P. Gannon
By Geo. H. Kennedy Jr.
Attorney Patented Jan. 5, 1932

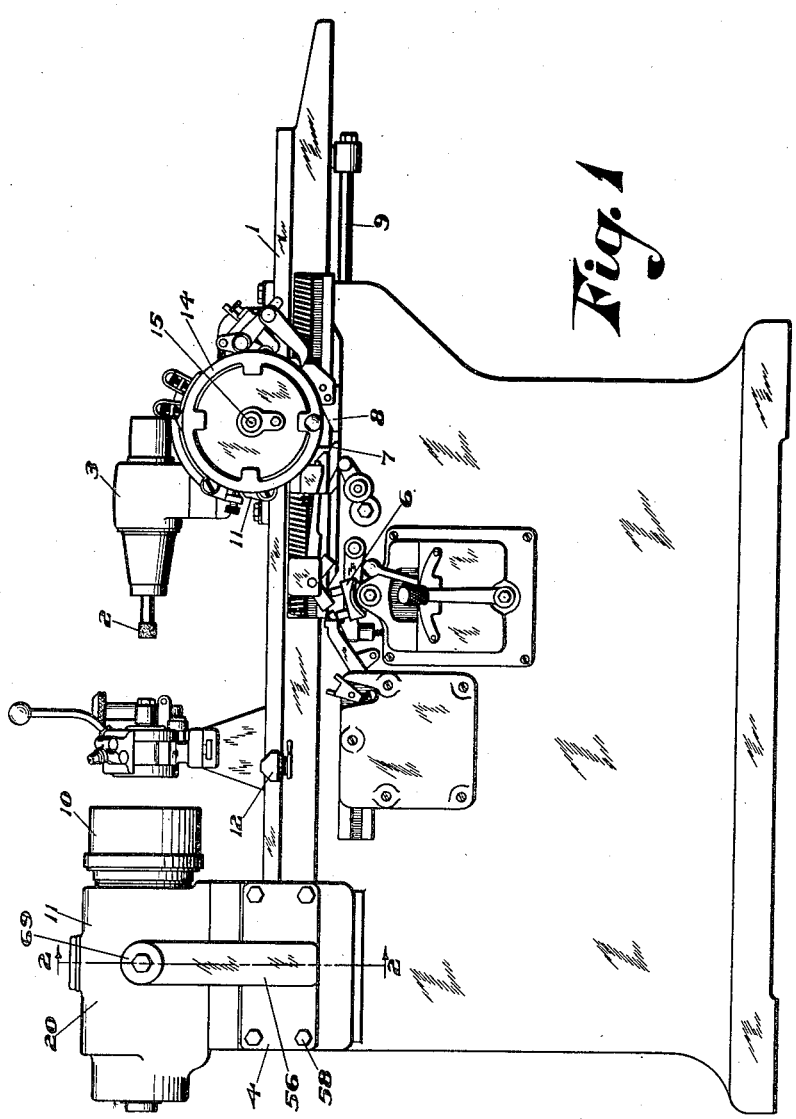

1,839,546

UNITED STATES PATENT OFFICE

GEORGE H. P. GANNON, OF WORCESTER, MASSACHUSETTS, ASSIGNOR TO THE HEALD MACHINE COMPANY, OF WORCESTER, MASSACHUSETTS, A CORPORATION OF MASSACHUSETTS

WORK HEAD FOR GRINDING MACHINES

Application filed May 25, 1928. Serial No. 280,563.

The invention relates to work heads for the grinding or turning of irregular shaped workpieces. The work head of the invention is shown applied to an internal grinding machine, by means of which a hole in a workpiece placed in said work head may be accurately ground to a predetermined irregular shape.

The term irregular shape as used above signifies any shape not truly circular, and includes ellipses or other shapes which are irregular only in the above sense. During recent years there has arisen an increased demand for parts having elliptical or elongated holes, and as such parts are usually intended to co-operate with a mating part having an external periphery of the same shape, as much accuracy is required in the grinding of these interior surfaces as is required in the grinding of any cylindrical hole.

The object of the invention, therefore, is to provide a work head which will allow a workpiece to be accurately ground in an automatic internal grinding machine. It will be readily seen that the use of a caliber mechanism to gage the size of the hole being ground would present extraordinary difficulties in a machine of this character, and therefore I have shown my invention in connection with a grinding machine embodying the principles disclosed in United States Letters Patent No. 1,682,672, granted August 28, 1928, to Waldo J. Guild and as improved according to Patent No. 1,682,673 to Edward M. Taylor, wherein the size of the workpiece is directly controlled from the cross-feeding mechanism of the grinding machine, the cutting surface of the wheel being brought to a predetermined plane during each grinding operation and subsequently advanced by a definite amount to complete the grinding of the workpiece.

A further object of the invention is to cause the lateral movement of the chuck carrying spindle which produces the irregularity in the hole of the workpiece to take place without producing an extra strain upon the spindle bearings. To that end a separate set of bearings are provided to take the lateral thrust of the spindle moving mechanism.

The above and other objects of the invention will hereinafter more fully appear from the following detailed description which, taken in connection with the accompanying drawings, represents an illustrative embodiment of the same.

In the drawings:—

Fig. 1 is a front elevation of a grinding machine provided with a work head constructed in accordance with the invention.

Fig. 2 is a vertical sectional view taken on the line 2—2 of Fig. 1.

Fig. 3 is a vertical longitudinal sectional view taken on the line 3—3 of Fig. 2.

Fig. 4 is a diagrammatic view showing a workpiece being ground.

Like reference characters refer to like parts throughout the drawings.

Referring first to Fig. 1, the grinding machine therein illustrated provides a reciprocatory table or carriage 1, by the movement of which the grinding traverse between the wheel and workpiece is produced. The grinding wheel 2 is suitably journalled in a grinding head 3 which is carried by the table 1, there being a cross-slide, not shown, interposed between the wheel head and table to provide for the transverse feed between the grinding wheel and a workpiece. The work head of the invention is carried by a bridge 4, which spans the slideways provided by the machine frame for the reciprocatory movement of the table 1.

The reciprocations of the table 1 to produce the aforesaid grinding traverse may be obtained in any desired manner, a fluid pressure actuating and reversing mechanism of the type shown in United States Letters Patent No. 1,582,468 to Heald and Guild being preferably employed. As disclosed in said patent, a reversing member 6 is alternately engaged by spaced adjustable dogs 7 and 8 carried by the table 1, the movements of said reversing member 6 being transmitted to a valve which causes fluid under pressure to be admitted first to one side and then the other of a cylinder containing the usual double acting piston whose piston rod 9 is connected to the table 1.

During the normal reciprocatory traverse of the table 1, while the grinding wheel 2 is grinding a workpiece carried by a suitable chuck 10, said grinding wheel may be moved in cutting relation to the workpiece by any suitable means. Such means may take the form of a pawl 11 pivotally mounted on an arm, not shown, the latter adapted to be raised when it, or some part of it, comes in contact with a stationary but adjustable cam member 12. Raising of the arm mentioned above, forces said pawl 11 into engagement with a ratchet wheel, not shown, attached or connected to a hand wheel 14, whose consequent angular displacement is ultimately transmitted to a centrally located screw shaft 15 that feeds the cross-slide, hereinbefore referred to, transversely of the table 1.

The above elements of the grinding machine for which the work head of the invention is particularly suited having thus been briefly introduced by way of example, the structure of the work head will now be described. As shown in Figs. 2 and 3, the bridge 4 has formed in its upper flat surface ways 16, 16 extending at right angles to the path of travel of the table 1, which moves under said bridge, the said ways supporting a cross-slide 17. A circular slot 18 is provided in said cross-slide and in the geometrical center of the circle defined by said slot is located a pivot block 19 having a cylindrical surface. The head stock 20 which supports the work spindle 21 is provided with a cylindrical depression 22 on its under side, which fits closely to the pivot block 19, thus to locate the head stock on the cross-slide, the head stock and cross-slide being held together in any desired position of angular adjustment by means of L-head bolts 23 and nuts 24, the heads of the former fitting in the slot 18.

The work spindle 21 may be driven in any suitable manner; as shown it has a pulley 25 fastened thereto, and the rotation of said spindle not only causes rotation of the workpiece, but also produces lateral movement thereof by the shifting of the entire head stock 20 and slide 17 on the ways 16 to produce the desired irregularity in the shape of the workpiece, the exact internal shape thereof being determined by a cam 52 that rotates with the spindle 21. As will readily be seen, by merely varying the shape of the cam 52, workpieces of many different internal shapes can be produced.

Returning now to the specific embodiment of the invention as disclosed in the drawings, the spindle 21 is suitably journalled in the head stock 20 as by means by ball bearings 26 and 27, whose inner races are fastened to said spindle 21 by means of shoulders 28 and 29 provided by the spindle, and nuts 30 and 31 which are screwed onto threaded portions 32 and 33 respectively of the spindle, in order to force said inner races against the aforesaid shoulders. The outer races of the ball bearings 27, which support that end of the spindle 21 nearest the chuck, are held in a sleeve 34 which has a detachable front portion 34a. Two separate sets of ball bearings 27 are provided in order that, by holding one pair of races rigidly and forcing the other pair of races together, as by means of the shoulder 29 and nut 31, play may be taken out of the bearing, this expedient being well known to the art.

The sleeve 34 fits in the internal cylindrical portion 35 of the head stock 20. The outer race of the ball bearing 26 in this instance fits in a separate internal cylindrical portion 36 provided by said head stock. In each case the parts fit closely, but not so tightly but what the spindle, ball bearings, and pulley 25 may be removed as a unit. An end plate 37 suitably fastened as by screws 38 to the head stock constitutes a limiting stop to position the removable spindle and associated parts. The end plate provides a plurality of holes 39 in which are located springs 40 that press against the outer race of the ball bearing 26 through the medium of an interposed ring 41, this means serving to remove play from the said ball bearing. Desirably glands 42 and 43 are provided to keep grit out of the ball bearings 26 and 27 respectively, these glands being supported by a ring 42a and the portion 34a respectively.

The pulley 25 which is rotated by means of a belt, not shown, provides a plurality of clutch teeth 44 on its front annular surface, said teeth engaging with a plurality of intermeshing teeth 45 provided by a sleeve 46 that surrounds, but is not fastened to, the spindle 21. A limited amount of clearance is provided between the internal cylindrical surface of the sleeve 46 and the external surface of the spindle 21, and the said sleeve 46 is journalled in the head stock 20 by means of ball bearings 47 and 48 the outer races of which are received in the internal bore 35 of the head stock 20.

As shown in Figs. 2 and 3 the sleeve 46 provides a peripheral flange 50 to which is detachably fastened as by means of screws 51 the cam 52 that determines the shape of the hole to be ground in the workpiece $a$. Said cam 52 contacts at one side a roller 53 provided with a plunger 54 that is stationary with respect to the machine frame and which is received in the bushing 55 located in a suitable hole formed in the side of the head stock. Contact of the periphery of the cam 52 with the roller 53 that is stationary in respect to the machine frame is assured by spring pressure directed against the head stock 20.

The stationary mounting of the roller 53 in contact with the cam 52 and the means for exerting spring pressure against the work head to cause the roller to follow the cam, thus moving the work head transversely of the machine on the cross ways 16, are best shown in Fig. 2. As shown in Fig. 2, a pair of very rigid and reinforced arms 56 and 57 are provided by the machine on the front and back of the work head respectively, said arms being conveniently fastened as by means of bolts 58 and 59 to the bridge 4. The arm 57 provides a horizontal hole 60 therethrough which receives a reduced portion 61 of the plunger 54 having screw threads of different diameter at 62 and 63, whereby the plunger may be rigidly fastened to the arm by means of nuts 64 and 65.

The arm 56 has an internal cylindrical portion 66 formed therein in which is slidably mounted a plunger 67 that is pressed towards the head stock 20 as by means of a heavy coil spring 68, an adjustment screw 69 and washer 70 being provided to vary the tension of the said spring. The plunger 67 abouts a hardened steel button 71 having a reduced portion which fits in a hole 72 provided by the headstock.

From the foregoing it will be apparent that the head stock is urged rearwardly of the machine, to cause the cam 52 to always press against the stationarily mounted roller 53 provided with the plunger 54, and consequently, as the spindle 21 carrying the work holding chuck 10 mounted on a front plate 73 provided by said spindle is revolving, the entire head stock 20 travels transversely of the machine by movement of the slide 17 on the ways 16, and the interior of the workpiece a is ground to a shape exactly similar to, although smaller than the cam 52. The shape of the hole b formed in the workpiece a by the rotating grinding wheel 2 is illustrated diagrammatically in Fig. 4, said shape being the same as the shape of the cam 52 illustrated in Fig. 2.

In order to remove play from the ball bearings 47 and 48, a shoulder 74 is provided in the internal cylindrical surface 35 of the head stock, and the outer races of said ball bearings are pressed together by reason of the fact that the outer race of the ball bearing 37, or a dirt guard ring 74a adjacent it, contacts with the said shoulder 74, while the outer race of the bearing 48 is in contact with the sleeve 34. The inner races of the said bearings are in contact with shoulders 75 and 76 provided by the sleeve 46. The ball bearings 47 and 48, and likewise the sleeve 46 are removable with the spindle 21— when the unit is placed in the annular head stock the sleeve 34 is pushed in far enough to take play out of these ball bearings.

It will be apparent that the reacting force due to the somewhat rapid travel of the head stock 20 on the ways 16, with the consequent rather considerable acceleration both negative and positive given to said head stock is in no wise transmitted to the spindle 25 to cause detrimental vibration or chattering of said spindle, but is taken by the ball bearings 47 and 48, and this is a very advantageous feature of the invention.

I claim:

1. In a grinding machine, the combination with a workholding chuck and a rotatably journaled spindle therefor, of a cam surrounding said spindle but separately journaled, connections between said cam and said spindle to cause rotation of the former when the latter is rotated, and a stationary cam follower, whereby said spindle and chuck are reciprocated relative to the machine frame without producing any lateral thrust on the spindle bearings.

2. In a grinding machine, the combination with a grinding wheel, a workholding chuck, and a rotatably journaled spindle for one of said elements, of cam means for reciprocating said spindle, said cam means being coaxial with and rotated directly with but separately journaled from said spindle, whereby to permit the grinding of irregular shaped holes in workpieces without any detrimental vibration of the spindle due to the force reciprocating it.

3. In a machine of the class described, a head-stock mounted for transverse reciprocation on a machine frame, a spindle, a set of bearings in said head-stock for said spindle, a cam surrounding said spindle, clutch means to procure rotation of said cam with said spindle, and separate bearings in said head-stock for said cam.

4. In a machine of the class described, the combination with a head-stock mounted for slidable motion on a machine frame, a spindle adapted to be journaled in said head-stock, and a cam connected to said spindle for producing a reciprocatory motion of said head-stock on said frame, said head-stock having one or more cylindrical bores, of separate sets of bearings for said spindle and said cam mounted on said parts respectively and adapted to fit in the said bore or bores, whereby the spindle, cam and bearings may be removed from said head-stock as a unit.

5. In a machine of the class described, the combination with a head stock mounted for slidable motion on a machine frame, a spindle journaled in said head stock, a cam journaled in said headstock independent of said spindle, said spindle and said cam being coaxial and connected severally to a common driving means whereby the spindle and cam are rotated simultaneously.

6. In a machine of the class described, the combination with a machine frame having ways, a cross slide mounted on said ways, a head-stock carried by said cross slide, a spindle journaled in said head-stock, a cam rotatable with said spindle, and a stationary member adapted to follow the periphery of said cam thereby to produce a reciprocatory motion of said head-stock and cross slide on said ways, of a cylindrical member forming part of said stationary member, said headstock having a cylindrical bore in the side thereof in which said cylindrical member fits, whereby to prevent vibration of said headstock as it reciprocates.

GEO. H. P. GANNON.